July 22, 1930. R. HAMBURGER 1,771,083
AIRCRAFT
Filed Feb. 9, 1927 2 Sheets-Sheet 2
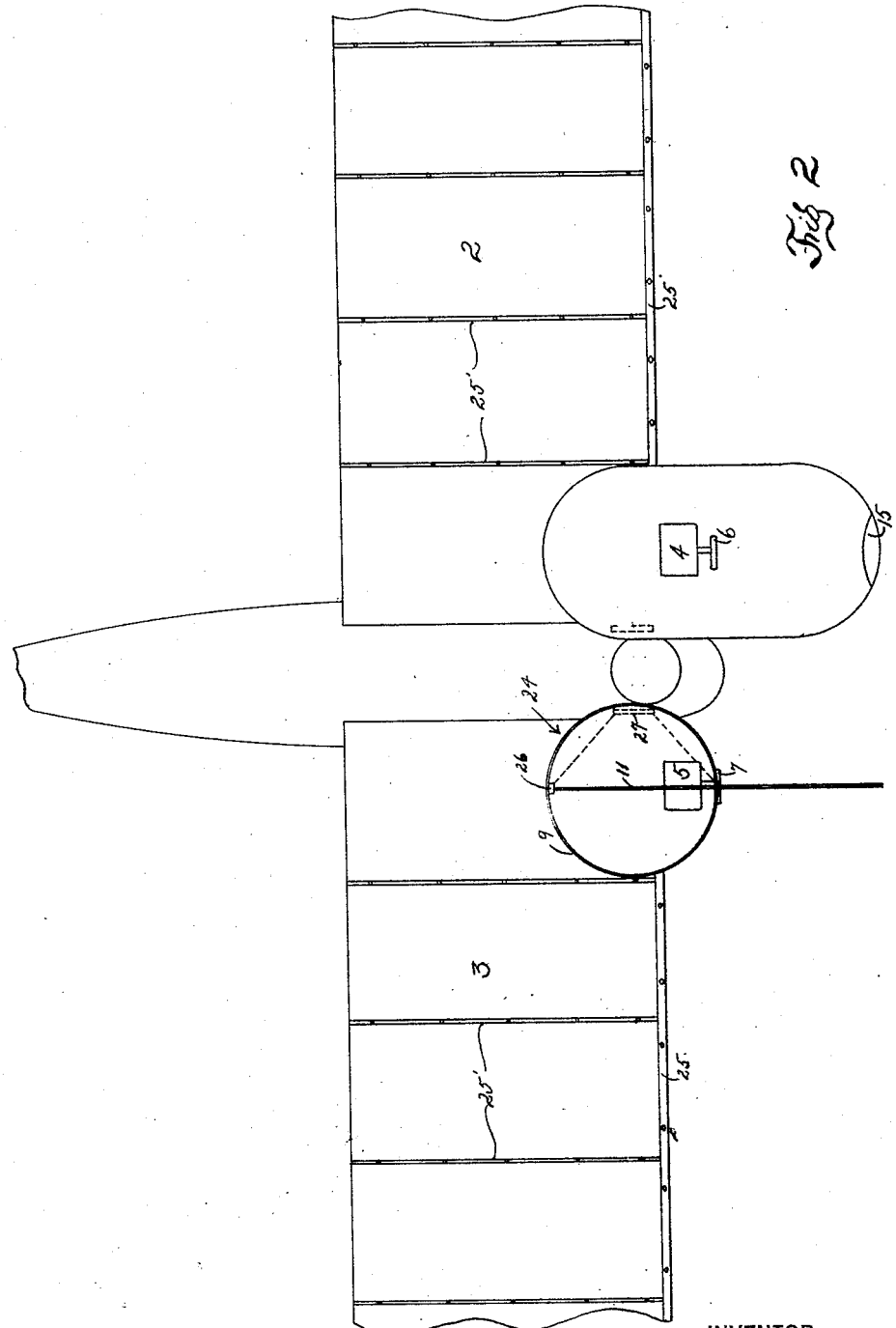

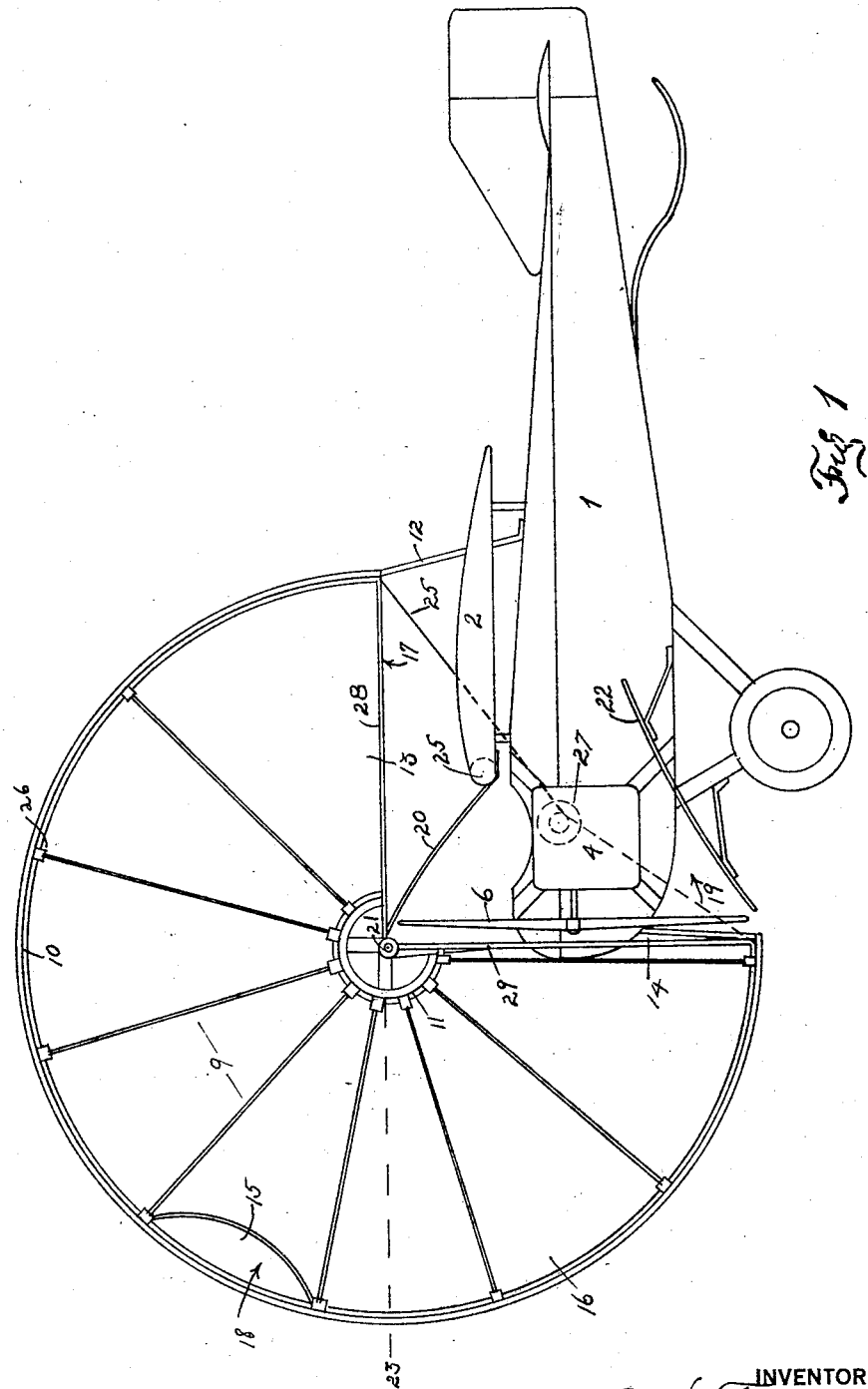

Patented July 22, 1930

1,771,083

UNITED STATES PATENT OFFICE

RUDOLF HAMBURGER, OF BROOKLYN, NEW YORK

AIRCRAFT

Application filed February 9, 1927. Serial No. 166,903.

An object of the invention is to provide means for materially assisting in elevating the plane or in allowing the plane to obtain its desired altitude in the shortest possible space of time.

Another object of the invention is to provide means whereby the nose of the plane may be readily retained at the desired upward angle and another object of the invention is to provide means for stabilizing the plane when traveling at a desired angle and still further objects of the invention are to provide means whereby motors of a slower speed may be employed and whereby safe descents may be made even with a stalled motor.

The means for accomplishing the foregoing objects and others not specified will be fully set forth as the specification progresses and the accompanying drawing should be referred to for a complete understanding of the specification which follows.

In the drawing:—

Fig. 1, is a side elevation of an aeroplane, a part being shown in section.

Fig. 2, shows a top plan view.

Similar reference numerals indicate like parts in all the figures where they appear.

As little or no change is made in the aeroplane proper, I have shown a conventional type of mono-plane and have indicated the body or fuselage of the plane by the reference character 1 and the wings at 2 and 3. It will be noted that the wings extend somewhat greater or that the wing spread is somewhat greater than that of the ordinary mono-plane of this general type and size and the reason for this will appear as the specification progresses.

The engines of my plane are arranged one at each side of the fuselage and are indicated at 4 and 5 and as ordinary types of engines are employed, no attempt is made to detail them.

As I employ two engines so also I employ two propellers, the propellers being shown at 6 and 7 and as ordinary, each propeller is driven directly from the engine being usually mounted upon the engine shaft.

My invention really comprises a plurality of canvas or fabric wind tunnels or suction devices. Each of these devices is formed as an elongated sack open at the ends and each comprises an envelope from the propeller to the adjacent wing and I will later refer to these devices as envelopes.

Each envelope is supported by a plurality of ring shaped ribs, as shown at 9. The ribs are secured to outer and inner guide members 10 and 11, supported by suitable brackets 12; the ribs extend radially from the ring member 11.

The fabric envelope is stretched over the ribs and its position, its condition of extension is determined by the relative position of the ribs.

It has previously been stated that the ends 13 and 14 of the envelope are open and it will also be noted that I provide an additional opening 15 in the top front side of each envelope.

In the usual operation of my device, when it is desired that the plane shall take off from the ground, the position of the envelopes is that shown in Fig. 1, wherein the envelope 16 is fully extended. When in this condition and with the motor and propeller in operation, air will be drawn in two directions, from the uppermost surface of the wings in the direction of the arrow 17 and obliquely downward through the opening 15 in the direction of the arrow 18. The air will be forced backward under the wings, as suggested by the arrow 19.

It is of course desirable that all of the wind from the propeller pass under the wings and it is also desirable that at least a certain portion of the wind stream have a distinctly upward direction. I have, therefore, provided two deflectors. The uppermost deflector shown at 20 not only serves to deflect the wind from the top of the propeller backward under the wing, but also serves as a supporting means for a shaft 21 which in turn supports the innermost guide ring 11. The lowermost deflector 22 starts upward toward the wing, directing the air or wind stream from the propeller under the wing.

When it is desired to ride at an approximately even keel or to alight easily and in the shortest space of time, the bottom portion of the envelope is folded upward, in other words, the open end 14 is brought up to the point 23. If, for any reason, such as the desirability for high speed, the operator finds it convenient, the entire envelope may be folded back upon the wing, as shown at 24 in Fig. 2, and in this position not only is the wind resistance reduced but the envelope serves as an additional supporting means, the envelopes being short auxiliary wings.

I believe it to be very desirable that the air be removed from the top side of the wings and while my envelopes will remove a portion of this air, I also provide auxiliary means for air removal consisting of the pipe 25 and the branch pipes 25' extending therefrom. These pipes serve as wing ribs or supports and each of these pipes is perforated. As the inner end of each pipe 25 is under its adjacent envelope, a certain amount of suction will be caused in the pipes and a certain amount of air removed from the top side of the wings.

It will of course be understood that I must provide means for closing the envelopes into the position shown at 23 in Fig. 2. This means consists of a flexible cable 25 which passes through the rib supporting clamps 26 and is attached to what is shown as the lowermost rib member. This cable passes over a hand operated drum 27, which may be revolved to move the cable and thus fold the envelope backward to a position just above the horizontal support 28.

The member 29 is a vertical support for supporting the outer ring 10 and this and the support 28 and the rings 10 and 11 will remain permanently in position.

The exact relative position of the motor and wings is not fixed. The position of the motor or the position of the wings may be changed at will and will be changed according to the type of aeroplane to which my device is adapted.

If the propeller is elevated to a horizontal axial relation with the wings, the lowermost deflectors may be omitted.

The principle here described must however be maintained although modifications may be made within the scope of the appended claims without departing from the principle or sacrificing the advantages of the invention.

Having carefully and fully described my invention, what I claim and desire to secure is:—

1. An aeroplane having a plurality of forwardly extending vertically disposed tubular and fabric envelopes, the ends of each said envelope being open, means for causing a suction through said envelopes and means for directing the discharge of air from said suction producing means.

2. An aeroplane having a plurality of forwardly extending tubular envelopes, a plurality of stationary circular vertically disposed guides for supporting said envelopes and means for moving said envelopes along said guides.

3. Means for removing the air from the top side of the wings of an aeroplane and for discharging it on the under side of said wings comprising a plurality of tubular fabric envelopes one arranged in each side of the body of said aeroplane and a circular guide for supporting each said envelope vertically and ahead of said aeroplane.

Signed at the city, county and State of New York, December, 1926.

RUDOLF HAMBURGER.